O. A. KENYON,
Assignor to S. S. & H. W. HURLBUT.
Brake for Wagons.
No. 8,817. Reissued July 22, 1879.
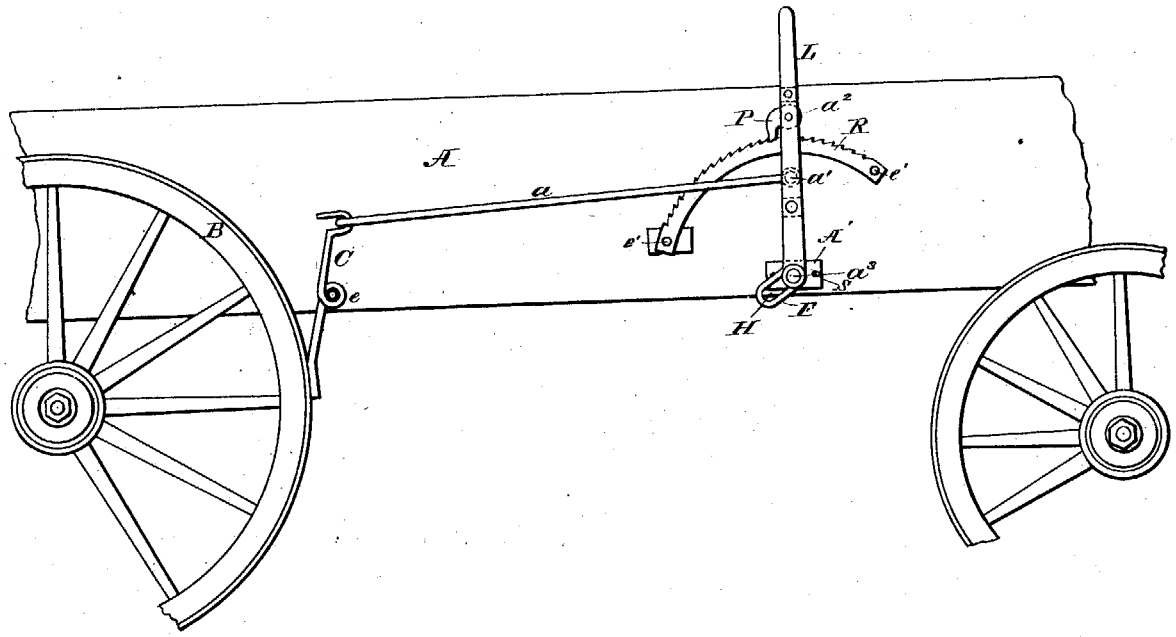
WITNESSES
Jesse Cox Jr.
P. E. Mooney
INVENTOR
O. A. Kenyon.
Per W. E. Dayton
Attorney.
N. PETERS, PHOTO-LITHOGRAPHER, WASHINGTON, D. C.

UNITED STATES PATENT OFFICE.

O. A. KENYON, OF McGREGOR, IOWA, ASSIGNOR TO SIDNEY S. AND HENRY W. HURLBUT, OF RACINE, WISCONSIN.

IMPROVEMENT IN BRAKES FOR WAGONS.

Specification forming part of Letters Patent No. 74,831, dated February 25, 1868; Reissue No. 8,817, dated July 22, 1879; application filed May 19, 1879.

*To all whom it may concern:*

Be it known that I, O. A. KENYON, of McGregor, in the county of Clayton and State of Iowa, have invented certain new and useful Improvements in Wagon-Brake Locks; and I do hereby declare that the following is a full, clear, and exact description thereof, reference being had to the accompanying drawing, and to the letters of reference marked thereon, which forms a part of this specification.

My invention relates to a new and improved method of constructing wagon-locks, by means of which the brake is more firmly held against the wheel, and whereby, also, the pressure of the same is more quickly and easily taken off.

It consists in the combination, with a toothed segment or rack, of a lever having a pawl or catch pivoted thereto, and adapted to have a longitudinal movement, whereby the pivot of the pawl or catch may, by a reverse action of the lever, be lifted or swung over the point at which the pawl engages the toothed segment, and the brake be thereby released.

As special devices adapted to this end, my invention embraces a lever having an oblique slot at its lower end, in which the fixed fulcrum-pin works, so that as power is applied to the upper end of the lever in the direction opposite to that in which it is applied in setting the brake the fixed fulcrum-pin slides in the slot, and the pawl pin is raised relative to the segment and may be swung over the point at which it catches the teeth of the segment, slacking the brake-rod.

The drawing is a side view of a wagon with my invention attached.

A is a wagon. B is the hind wheel. C is a brake secured to wagon A by pivot *e*. L is a lever, by means of which brake C is operated. *a* is a connecting-rod connecting brake C to lever L. P is a pawl pivoted to lever L. R is a toothed segment secured to wagon A by screws $e'$. $a^2$ is a pivot, on which pawl P turns. F is the short or bent arm of lever L. H is a slot in arm F of lever L. $a^3$ is the pivot on which lever L turns. S are screws securing the plate A′ to the wagon A. A′ is a plate secured to wagon A, to which pivot $a^3$ is secured. At any convenient place on the wagon A, near the bottom and front end of the same, as shown, is secured, by screws S, in the ordinary way, a plate, A′, said plate A′ being provided with a start or pivot, $a^3$, rigidly secured to said plate so as to stand at right angles to the side of the wagon A when the said plate A′ is secured to said wagon A. The lever L is provided with a slot, H, through the bent end or arm F of the same, as shown in the drawing, to receive the pivot $a^3$, and so as to slide upon said pivot. Through the lever L, and near the middle of the same, is a slot to receive the pawl P, which is pivoted to said lever in said slot in the same by a pivot, $a^2$. Upon the wagon A is secured, by any suitable screws $e'$, a metallic toothed segment, R, so situated, as shown in the drawing, that the pawl P will engage in the teeth of the same, so as to hold the lever L in any desired position in the forward or backward movement of the same. The lower end or arm, F, of the lever L is bent so as to form any required angle with the body of the same, and said arm F is provided with a slot, H, through the whole length of the same, so as to receive and slide upon the pivot $a^3$, so that in the forward motion of the upper arm of the lever L the pivot $a^3$ will be a fulcrum upon which said lever L turns, and in reversing the motion of the upper arm of the lever L the arm F will slide over the pivot $a^3$, raising the pin $a^2$ with reference to the segment, and permitting it to be carried backward over the bearing-point of the catch P upon the segment.

The connecting-rod *a* is pivoted to the lever L at $a^1$, below the pin $a^2$ of the pawl P. Just forward of the hind wheel, B, is pivoted the brake C by the pivot *e*, in such manner that one arm of the same may be forced against the circumference or tire of the hind wheel, B. Said brake C may be of any convenient shape, having a spring wound around the pivot *e* in such a way as that the pressure of the brake may be against the pressure of said spring, or in any other convenient way. The upper end of the same is provided with a hook or pivot, to which the rear end of the connecting-rod *a* is attached, as shown in the drawing, in such a way that by the forward movement of the longer arm of the lever L the lower arm of the brake C will be forced against the tire of the wheel B, and the pawl P will drop into one of the teeth of the segment R, thereby holding said brake C firmly against said tire. By the reverse operation of said lever L the arm F will slide over the pivot $a^3$, thereby disengaging the pawl P from the segment R, as already described, and relieving the pressure of the brake C from the tire of the wheel B. Obviously any other form or arrangement of brake may be used with my improved lock.

Having thus described my invention, I claim and desire to secure by Letters Patent—

1. The tooth segment or rack R, combined with the lever L, having a pawl or catch, P, pivoted thereto, said lever being adapted to have a longitudinal movement with reference to its center of vibration, whereby in reversing the movement of the lever after setting the brake the pawl's pivot-pin $a^2$ is raised with reference to the toothed face of the segment sufficiently high to be swung over the bearing of the point of the pawl or catch P on said rack, substantially as and for the purpose described.

2. The slotted arm F of the lever L, in combination with the pivot $a^3$, pawl P, segment R, and connecting-rod $a$, substantially as herein described, and for the purpose specified.

In testimony that I claim the foregoing as my invention I affix my signature in presence of two witnesses.

O. A. KENYON.

Witnesses:
ASAHEL CHAPIN,
JOSEPH ANDRES.